US007880458B2

(12) United States Patent
Cannella et al.

(10) Patent No.: US 7,880,458 B2
(45) Date of Patent: Feb. 1, 2011

(54) METHOD AND DEVICE FOR DRIVING POWER CONVERTERS

(75) Inventors: Eliana Cannella, Mascalucia (IT); Claudio Adragna, Monza (IT); Filippo Marino, Tremestieri Etneo (IT); Salvatore Tumminaro, Marianopoli (IT)

(73) Assignee: STMicroelectronics, S.r.l., Agrate Brianza (IT)

(*) Notice: Subject to any disclaimer, the term of this patent is extended or adjusted under 35 U.S.C. 154(b) by 259 days.

(21) Appl. No.: 11/634,655

(22) Filed: Dec. 4, 2006

(65) Prior Publication Data
US 2007/0126409 A1     Jun. 7, 2007

(30) Foreign Application Priority Data
Dec. 2, 2005     (EP)     ............... 05425865

(51) Int. Cl.
*G05F 1/575*     (2006.01)
*G05F 1/595*     (2006.01)
(52) U.S. Cl. ............... 323/288; 323/271; 323/284
(58) Field of Classification Search ......... 323/271, 323/284, 288, 282; 363/56.04
See application file for complete search history.

(56) References Cited

U.S. PATENT DOCUMENTS

| 4,447,867 | A * | 5/1984 | Evans et al. | 363/56.04 |
|---|---|---|---|---|
| 6,275,019 | B1 * | 8/2001 | Fisher | 323/288 |
| 6,621,256 | B2 * | 9/2003 | Muratov et al. | 323/282 |
| 6,737,842 | B2 * | 5/2004 | Bai et al. | 323/282 |
| 7,619,395 | B2 * | 11/2009 | Mok et al. | 323/224 |
| 2004/0012346 | A1 * | 1/2004 | Green et al. | 315/291 |
| 2005/0146311 | A1 * | 7/2005 | Kuo et al. | 323/282 |
| 2005/0184714 | A1 | 8/2005 | Rusu et al. | |
| 2006/0221646 | A1 * | 10/2006 | Ye et al. | 363/13 |
| 2007/0085520 | A1 * | 4/2007 | Ho | 323/282 |
| 2008/0024101 | A1 * | 1/2008 | Huang et al. | 323/282 |

FOREIGN PATENT DOCUMENTS

DE     19639873 A1     6/1997
JP     2005261091 A *     9/2005

OTHER PUBLICATIONS

Ballou, G. (2000). Capacitors and inductors. In R. Dorf (Ed.), The electrical engineering handbook (pp. 15-17). Boca Raton, FL: CRC Press LLC.*
European Search Report, EP05425865, May 24, 2006.

(Continued)

*Primary Examiner*—Jeffrey L Sterrett
*Assistant Examiner*—Fred E Finch, III
(74) *Attorney, Agent, or Firm*—Lisa K. Jorgenson; Kevin D. Jablonski; Graybeal Jackson LLP

(57) ABSTRACT

A device and method for driving a converter circuit that supplies a charge via a first electronic switch and a second electronic switch alternately turned on and off. A generator module generates a memory signal, indicating the duration of a first dead-time interval. A delay module, sensitive to the memory signal controls turning-on of the first electronic switch with a delay, with respect to turning-off of the second electronic switch, so that a second dead-time interval has a duration substantially equal to the duration of the first dead-time interval.

14 Claims, 3 Drawing Sheets

OTHER PUBLICATIONS

Data Sheet, LM5025 Active Clamp Voltage Mode PWM Controller, 2004 National Semiconductor Corporation, XP002378901, 2004.

Danz, George, E., HIP5500 High Voltage (500vdc) Power Supply Driver IC, Intersil Intelligent Power No. AN9335, XP002378901, pp. 1-14, Dec. 1993.

European Patent Office, Office Action, Applicant: STMicroelectronics S.r.I., Application No. 05 425 865.2-2207, Ref.: BEP8319-LB, Feb. 20, 2008.

* cited by examiner

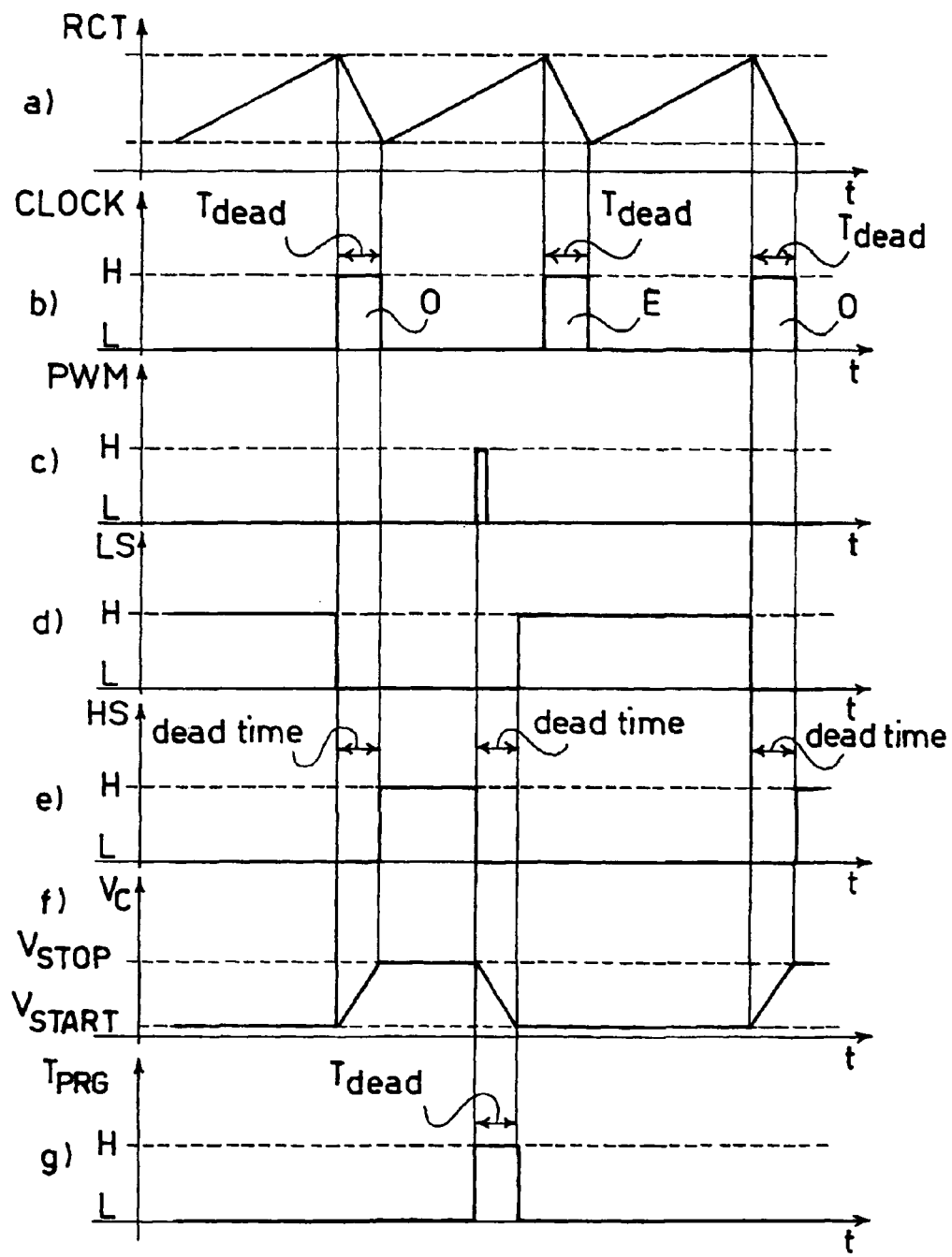

US 7,880,458 B2

METHOD AND DEVICE FOR DRIVING POWER CONVERTERS

PRIORITY CLAIM

This application claims priority from European patent application No. 05425865.2, filed Dec. 2, 2005, which is incorporated herein by reference.

TECHNICAL FIELD

Embodiments of the invention relate to techniques for driving power converters, in particular of the type the operation of which is based upon a pulse-driving technique, such as for example a pulse-width-modulation (PWM) driving technique.

BACKGROUND

In order to provide a clearer picture in which to contextualize embodiments of the invention, useful reference may be made to the block diagram represented in FIG. 1, which is a block diagram of a voltage regulator designed to drive a load L through a voltage regulator VR, controlled by means of two electronic switches (typically two MOSFETs) set between a supply voltage $V_{IN}$ and the ground G, with the function, respectively, of high-side switch HS and low-side switch LS.

The configuration represented in FIG. 1 is provided purely by way of example of a possible context for application of embodiments of the invention and hence must not be understood as in any way limiting the scope of the invention itself.

Usually, the voltage regulator VR is driven through the collectors or drains of the two high-side and low-side MOSFETs (or equivalent components) HS and LS, connected to one another, while the corresponding driving terminals (bases or gates) are driven by a driver D that receives a PWM driving signal from a controller C. The input of the controller is derived from an error amplifier EA, which detects the deviation between a reference voltage $V_{REF}$ and a feedback signal F drawn from the load L through a feedback line F.

Basically, the PWM signal output from the controller C drives the switches HS and LS, enabling transfer of the energy from an input represented by the supply voltage $V_{IN}$ to an output represented by the load L.

The voltage-regulator diagram represented in FIG. 1, which, as has been said, has a character purely of example, comprises in itself various possible alternative solutions. In particular, in the case of topologies of a double-ended type, such as the ones referred to as half-bridge or active-clamp topologies, the control of the switches HS and LS occurs in a complementary way. In particular, for half-bridge topologies, the complementary or asymmetrical control is actuated so as to obtain zero-voltage switching (ZVS) of the electronic switches HS and LS. Since the latter are usually components, such as MOSFETs, in order to guarantee that zero-voltage switching occurs, it is necessary to introduce between turning-off of one of the MOSs and turning-on of the other a dead time, which can be programmed to a desired value.

A solution commonly adopted in controllers for double-ended topologies with complementary driving envisages external programmability of the dead time by using a dedicated pin, to which a resistor is connected. A solution of this type is described in the National Semiconductor data sheet "LM 5025 Active Clamp Voltage Mode PWM Controller", March, 2004, which is incorporated herein by reference.

Alternatively, instead of using a dedicated pin, it is possible to consider exploiting a pin that enables locking of a frequency of an oscillator. A solution of this type is described in the publication by George E. Danz "HP5500 High Voltage (500$V_{DC}$) Power Supply Driver IC" Intersil Intelligent Power, December 1993, which is also incorporated herein by reference. As described in this publication, it is possible to consider making the oscillator by programming it externally through a resistive-capacitive ($R_T$-$C_T$) network that generates a sawtooth waveform. During the descending ramp of the sawtooth, a clock pulse is issued, which can be used as dead time.

This behavior is schematically represented in the diagrams of FIG. 2. In particular, FIG. 2 is constituted by four superimposed diagrams, designated, respectively, by a, b, c, and d, referred to one and the same time scale t on the abscissa. The uppermost diagram, designated by a, represents the sawtooth waveform generated by the resistive-capacitive network in question. As regards the block diagram of FIG. 1, this network can be viewed as being in the controller C, even though it is usually external to the controller to enable programmability of the oscillator.

The diagram designated by b corresponds to a train of clock pulses used for generating the dead time $T_{dead}$. The pulse train, which is also generated within the controller C, can be treated (via a logic circuit in the controller C) in such a way as to separate the even pulses E from the odd pulses O.

The aim again here is to use the leading edge of the odd pulses O to turn off the low-side MOS LS and the trailing edges of the same pulses to turn on the high-side MOS HS. Furthermore, as described in the publication by George E. Danz cited previously, it is possible to consider using the leading edge of the even pulses E to turn off the high-side MOS HS and the trailing edge of the same pulses to turn on the low-side MOS LS. In this way, between turning-off of one MOS and turning-on of the other, there elapses the same time, and moreover the even pulses E limit the maximum time of conduction of the high-side MOS HS and guarantee that the maximum duty cycle is less than 50%.

This type of behavior is represented in the further diagrams of FIG. 2 designated by c and d. The corresponding waveforms represent the waveforms that the driver D applies to the gate of the low-side MOS LS (diagram c) and to the gate of the high-side MOS HS (diagram d).

In diagrams b, c and d of FIG. 2, the symbols H and L obviously designate a logic signal of a "high" level and a "low" level, respectively. It may be noted that the switching frequency $f_{sw}$ is exactly half that of the sawtooth signal of the oscillator and that, during the time intervals designated by $T_{dead}$, both of the MOSs HS and LS are off.

By adopting this solution, the behavior of the circuit is in effect fixed in a rigid way by the train of clock pulses. The system described in the Danz publication functions in the way described above, guaranteeing that the two time intervals introduced between turning-off of one MOS and turning-on of the other are equal (because they are obtained once again starting from the clock). In this case, the MOS HS is always turned off by the clock.

In the case where it were necessary to turn the MOS HS off before (for example, via a signal generated by a control loop), it is no longer possible to use the trailing edge of the even pulse of the clock to turn on the MOS LS after the time $T_{dead}$ because turning-off of the MOS HS would occur at an instant that is asynchronous with respect to the clock.

There exist applications in which it is effectively required that the high-side MOS HS be turned off in response to the control loop, in other words by a completely asynchronous signal. In these conditions of asynchronous operation, to turn on the low-side MOS LS after the dead time equal to the one introduced between turning-off of the low-side MOS LS and turning-on of the high-side MOS HS, it is not possible to use the even pulses E of the clock signal of diagram b.

SUMMARY

In the light of what has been described above, an embodiment of the present invention is enabling the aforesaid operation in an asynchronous way and enabling assurance that, between turning-off of the high-side MOS HS (in general, the electronic switch) and turning-on of the low-side component or switch LS, there is once again present the same "dead" time inserted between turning-off of the low-side switch LS and turning-on of the high-side switch HS.

BRIEF DESCRIPTION OF THE DRAWINGS

Embodiments of the invention will now be described, purely by way of non-limiting example, with reference to the annexed drawings, in which:

FIG. 5 is a set of timing diagrams, designated, respectively, as a to g, which represent, on the basis of a common time scale, the pattern of various signals generated during operation of the components of FIGS. 3 and 4.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
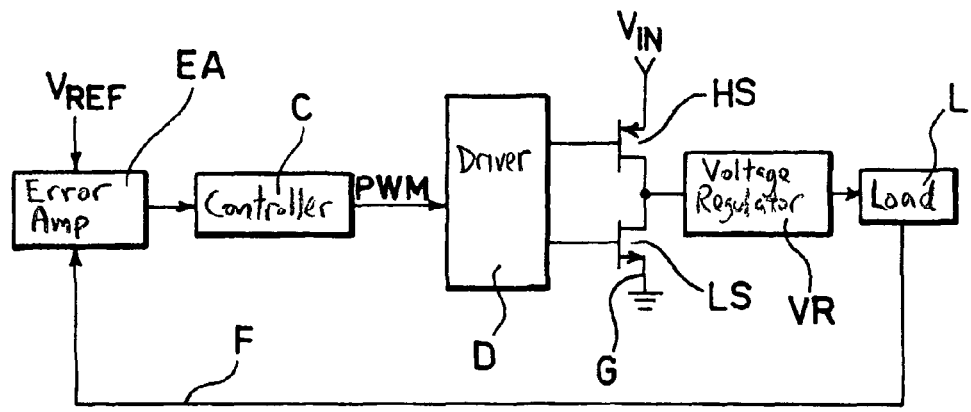
FIGS. 1 and 2, corresponding to the known art, have already been described.
Figure 3:
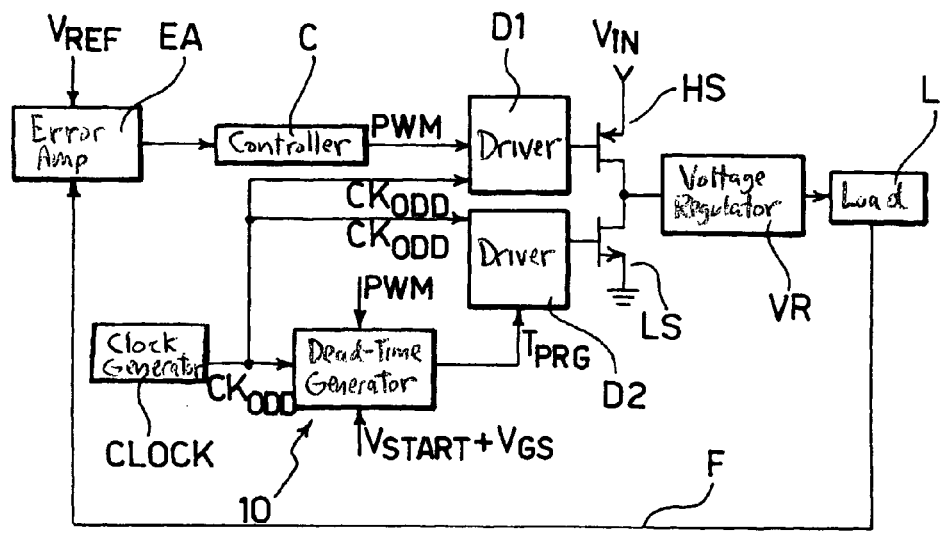
FIG. 3 is a block diagram that illustrates one embodiment of the present invention.

Basically, the circuit diagram of FIG. 3 amounts to the same basic scheme as the circuit diagram of FIG. 1. For this reason, elements that are identical or equivalent to one another have been designated in FIGS. 1 and 3 with the same references.

In the diagram of FIG. 3, the driver D of FIG. 1 is represented split into two parts, D1 and D2, which perform, respectively, the driving of the high-side component or switch (MOSFET) HS and of the low-side component or switch (MOSFET) LS.

The part of the driver D1 that drives the high-side component HS receives at input the odd pulses $CK_{ODD}$ (designated also by O in diagrams b of FIGS. 2 and 5) of a train of clock pulses produced by a generator designated as CLOCK.

In the exemplary embodiment illustrated herein (which, it is emphasized, is nothing more than an example), the driver D1 uses the trailing edges of the odd pulses O to turn on the high-side MOS HS.

The part of the driver D1 that drives the high-side component HS also receives at input the PWM signal coming from the controller C, which, through the error amplifier EA, receives the feedback signal F from the load L.

The chain of elements EA, C and D1 is configured (in a known way) so that the driver D1 turns off the high-side MOS HS as a result of the issuing of the feedback signal F.

For this purpose, the driver D1 receives a PWM signal in the form of a narrow pulse (see diagram c of FIG. 5), generated as a result of the comparison between the signal present on the feedback line F and the signal $V_{REF}$ at input to the block EA of FIG. 3.

The part of the driver D2 that drives the low-side component LS also receives the odd pulses $CK_{ODD}$ (i.e., O in diagrams b of FIGS. 2 and 5) and uses the leading edges of these pulses to turn off the low-side MOS LS.

Turning-on of the low-side MOS LS is instead controlled by the driver D2 as a function of a signal $T_{PRG}$ produced by a dead-time generator 10, the function of which is to ensure that, between turning-off of the high-side MOS HS (controlled in an asynchronous way, i.e., in general in a way not co-ordinated with the clock signal produced by the clock generator) and turning-on of the low-side component LS, there is always present the same "dead" time inserted between turning-off of the low-side switch LS and turning-on of the high-side switch HS.

Figure 2:
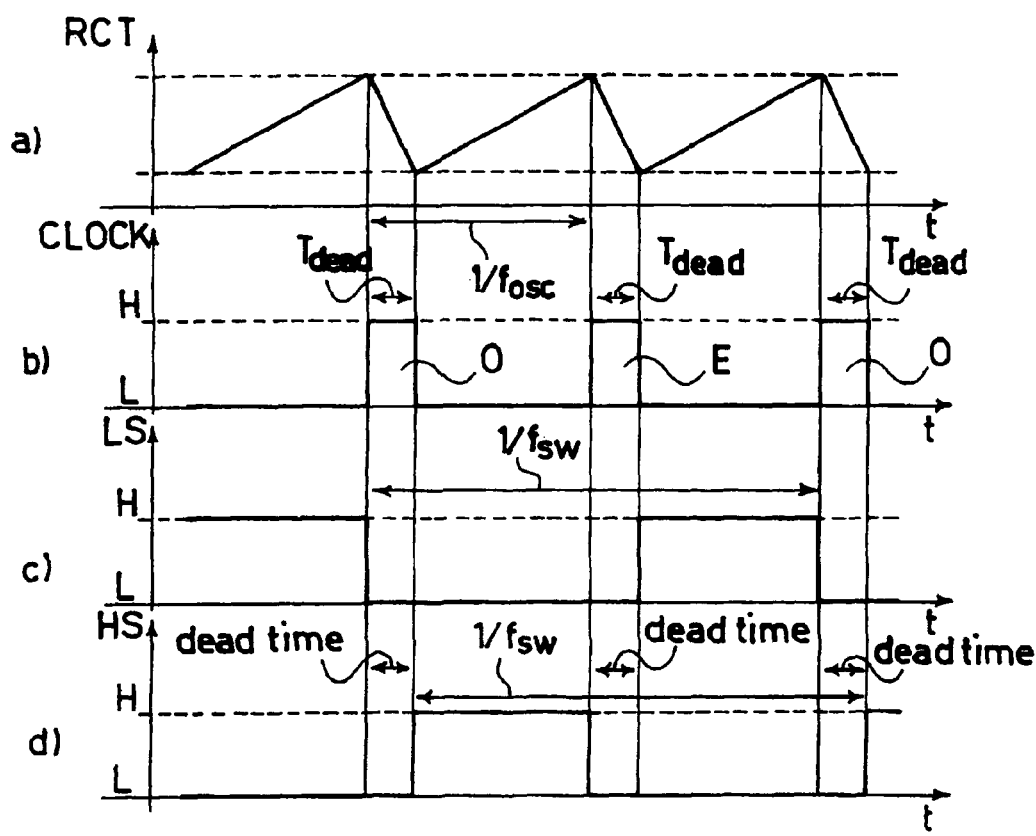

The generator 10, roughly resembling a delay line with variable-delay value, receives at input the following signals:

the odd pulses $CK_{ODD}$ (i.e., O in diagrams b of FIGS. 2 and 5);

the PWM signal of the controller C;

a supply voltage $V_{SUPPLY}$ (FIG. 4), regulated via a MOSFET 20 adjusted with a gate voltage $V_{START}+V_{GS}$.

The generator 10 produces at an output a signal $T_{PRG}$ (see diagram g of FIG. 5) that functions—via its trailing edge—as a turning-on signal for the low-side switch LS.

If we examine the diagram of the generator 10 appearing in FIG. 4 in greater detail, it may be noted that a MOSFET 20 is set with its drain connected to the voltage $V_{SUPPLY}$ and its source coming, through a switch 30 (which will be described in greater detail in what follows), under a capacitive component (capacitor) C, the pin or plate of which, opposite to the MOSFET 20, is connected to ground G. Across the capacitor C there will thus in general be present a voltage $V_C$.

The references 11a and 11b designate two current generators (made according to any known circuit scheme), which are able to supply or drain a d.c. current of equal intensity I with respect to the line of connection between the MOSFET 20 and the capacitor C according to the state of opening or closing of respective switches 12 and 13.

The switches 30, 12 and 13 are usually ordinary solid-state switches (e.g., transistors or FETs) built according to altogether known criteria.

The reference number 14 designates then a flip-flop FF, the input of which is driven with the PWM signal coming from the controller C (a PWM signal which, as has been seen, contains in itself the information of feedback of the load present on the line F).

The flip-flop 14 has an output Q, which generates the signal $T_{PRG}$ that drives the switch 13 both in opening and in closing.

The reference number 18 designates a comparator, the threshold level of which is fixed at a voltage value $V_{START}$ (see also the gate supply of the MOSFET 20). The comparator 18 is configured in such a way as to compare the signal $V_C$ present across the capacitor C with the aforesaid threshold value $V_{START}$. The output of the comparator 18 functions as clocking input of the flip-flop 14 and is also transferred, through a logic inverter 19 to the switch 30.

For immediate reference with regard to the ensuing description, it is recalled that, in FIG. 5, diagrams a and b have the same meaning assumed in FIG. 2. Diagram c of FIG. 5 illustrates, instead, the pattern of the PWM signal (indicated also at input to the block 14 of FIG. 4) whereas diagrams d and e illustrate the driving signals (or, more correctly, the states of conduction or "turning-on"—high logic level H—and of non-conduction or "turning-off"—low logic level L—of the low-side MOSFET LS and high-side MOSFET HS.

Diagram f represents the voltage $V_C$ across the capacitor C, which varies between the value $V_{START}$ and a value designated in general by $V_{STOP}$.

Finally, diagram g represents the dead-time pulse imposed between turning-off of the high-side MOSFET HS and turning-on of the low-side MOSFET LS.

Figure 4:
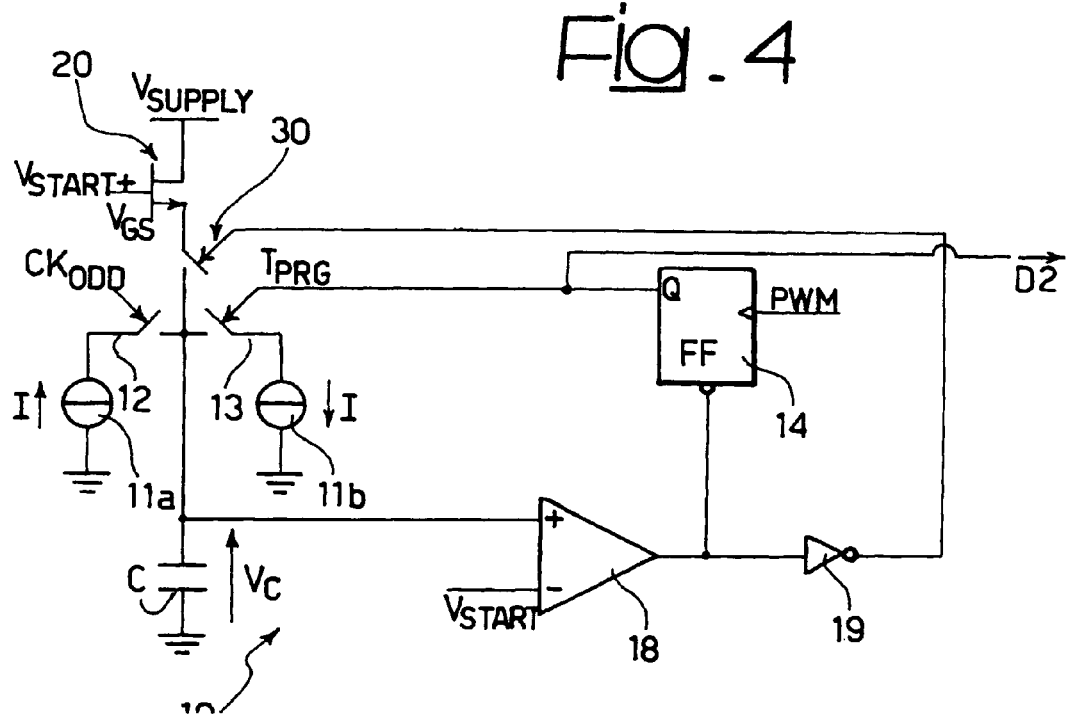
FIG. 4 is a detailed block diagram of one of the modules represented in FIG. 3, namely, a control circuit, according to one embodiment of the present invention.

To illustrate operation of the circuit represented in FIG. 4 it will be assumed that initially the signal $CK_{ODD}$ (corresponding to the odd pulses O of the train of pulses of diagrams b of FIGS. 2 and 4) is at the low level and that the capacitor C is discharged. With these conditions, the voltage across the capacitor C is lower than the threshold voltage $V_{START}$, which constitutes the threshold level of the comparator 18.

The output of the comparator 18 is hence at the low logic level, so that the flip-flop 14 is reset. The signal $T_{PRG}$ is at the low level; the switch 30 is thus closed, and the switches 12 and 13 are open.

With these conditions, the voltage across the capacitor C increases up to the value $V_{START}$, and once this value is reached the output of the comparator 18 goes to a high level so that the reset input of the flip-flop 14 goes to the high level and the switch 30 goes into an opening condition. In these conditions, the voltage across the capacitor C remains at the value $V_{START}$. As soon as the signal $CK_{ODD}$ goes to the high level, the switch 12 closes and the voltage across the capacitor C starts again to increase throughout the dead time of the clock pulse O, the leading edge of which corresponds to turning-off of the low-side MOSFET LS. The current I is chosen so as to guarantee that the voltage across the capacitor C will increase linearly for a time fixed by the duration of the aforesaid pulse (i.e., by the dead-time interval associated to the odd pulses of the clock signal). This pattern is clearly detectable in diagram f of FIG. 5.

As soon as the signal $CK_{ODD}$ goes to the low level, the switch 12 opens, and the charge of the capacitor C is interrupted. In the time corresponding to the dead time, the voltage across the capacitor C has passed from the value $V_{START}$ to the value $V_{STOP}$ (see again diagram f of FIG. 5). The charge accumulated on the capacitor C thus constitutes a memory signal, which stores the duration of the (first) dead-time interval that has elapsed between turning-off of the low-side switch LS and turning-on of the high-side switch HS.

When the signal HS goes to the low level in so far as the corresponding MOSFET HS turns off in response to the control loop (compare diagrams c and e of FIG. 5), the output Q of the flip-flop 14 (and hence the signal TPRG that drives the switch 13) goes to the high level, and the switch 13 goes into a closing condition.

Assuming that the current generators 11a and 11b generate currents of substantially the same intensity (with opposite direction), the voltage across the capacitor C drops at this point from the value $V_{STOP}$ to the value $V_{START}$ with a slope equal to the one with which it had previously risen from the value $V_{START}$ to the value $V_{STOP}$. In other words, the time for discharging the capacitor C will be equal to that of charging. Of course, by "charging/discharging" is meant here the passage between the voltage values $V_{START}$ and $V_{STOP}$.

As soon as the capacitor C discharges, i.e., when the voltage across it reaches the value $V_{START}$, the output of the comparator 18 returns to the low level, resetting the flip-flop 14, i.e., taking the signal $T_{PRG}$ to the low level, which, in addition to opening the switch 13, turns on the low-side switch LS through the driver D2.

The above occurs with a delay, with respect to the feedback pulse signal obtained starting from the signal sent by the load L on the line F, which has a value equal to the dead-time interval desired, and this in so far as the charge accumulated on the capacitor C constitutes a memory signal, which stores the duration of the (first) dead-time interval that has elapsed between turning-off of the low-side switch LS and turning-on of the high-side switch HS. In this way, it ensures that between turning-off of the high-side MOSFET (in general, the electronic switch) HS and turning-on of the low-side component or switch LS there is always present a (second) interval of "dead" time equal to the dead-time interval inserted between turning-off of the low-side switch LS and turning-on of the high-side switch HS.

The signal $T_{PRG}$, issued during the process of discharging of the capacitor C, conveys in fact the information of memory of the dead time between turning-off of the low-side MOS LS and turning-on of the high-side MOS HS: the value stored can consequently be used as the dead time between turning-off of the high-side MOS HS and turning-on of the low-side MOS LS, rendering the two dead-time intervals in question substantially identical to one another, i.e., substantially of equal duration.

The expression "of substantially equal duration" of the first dead-time interval and of the second dead-time interval is intended of course to take into account the approximations in each case linked to the determination and measurement of the duration of the intervals.

Of course, without prejudice to principles of the invention, the details of construction of alternative embodiments may vary widely with respect to what is described and illustrated herein, without departing from the scope of the present invention, as defined by the annexed claims. In particular, persons skilled in the art will appreciate that, even though the example embodiments represented herein refer to the use of MOSFET components as electronic switches HS and LS, other embodiments include alternative types of electronic switches with similar functions that are to be switched alternately into a state of conduction or activation (switch "on") and into a state of non-conduction or deactivation (switch "off") in cases where it is necessary to ensure correct definition of the period of dead time. For example, in other embodiments of the invention the electronic switches are formed by bipolar transistors or similar components. It is moreover evident that the roles of the two high-side and low-side switches can be reversed, so causing the action of driving described herein with reference to the low-side switch LS to be applied to the high-side switch HS, and vice versa.

Power converters formed according to embodiments of the present invention may be contained in a variety of different types of electronic systems. In the example of FIG. 3, the load L can thus be viewed as corresponding to different types of electronic circuitry depending upon the type of electronic system containing the power controller. The load L may thus be viewed as corresponding to computer circuitry, cellular telephone circuitry, portable digital assistant circuitry, automotive control circuitry, and so on.

The invention claimed is:

1. A method for driving a converter circuit for supplying a load via a first electronic switch and a second electronic switch alternately turned on and off with a first dead-time interval between turning-off of the first electronic switch and turning-on of the second electronic switch and a second dead-time interval between turning-off of the second electronic switch and turning-on of the first electronic switch, in which turning-off of said second electronic switch is controlled as a function of a feedback signal coming from said load, the method comprising the operations of:
  turning off the second electronic switch responsive to the feedback signal exceeding a threshold value;
  generating a memory signal indicating the duration of said first dead-time interval, wherein generating the memory signal includes charging a capacitive component during said first dead-time interval; and
  controlling turning-on of said first electronic switch with a delay, with respect to turning-off of said second electronic switch, identified by said memory signal, so that said second dead-time interval has a duration substantially equal to the duration of said first dead-time interval, and wherein said second dead-time interval has a duration determined by discharging the same capacitive component.

2. The method according to claim 1, wherein the method comprises the operation of charging and discharging said capacitive component between an upper level of charge and a lower level of charge, said lower level of charge being other than zero.

3. A device for driving a converter circuit for supplying a load via a first electronic switch and a second electronic switch alternately on and off with a first dead-time interval between turning-off of the first electronic switch and turning-on of the second electronic switch and a second dead-time interval between turning-off of the second electronic switch and turning-on of the first electronic switch, the device comprising:
  a generator module to charge a capacitive component to generate a memory signal indicating the duration of said first dead-time interval; and
  a delay module sensitive to said memory signal for controlling turning-on of said first electronic switch with a delay, with respect to turning-off of said second electronic switch, identified by said memory signal, so that said second dead-time interval has a duration substantially equal to the duration of said first dead-time interval, and wherein the delay between the turning-off of said second electronic switch and the turning-on of said first electronic switch has a value determined by the discharging of the capacitive component; wherein turning-off of the second electronic switch is controlled as a function of a feedback signal coming from said load and exceeding a threshold value.

4. The device according to claim 3, wherein coupled to said capacitive component is a threshold comparator that is sensitive to the level of charge of said capacitive component with a threshold level different from zero.

5. A method for driving a converter circuit, comprising:
  deactivating a first switch control signal responsive to a first edge of clock pulse signal;
  activating a second switch control signal responsive to a second edge of the clock pulse signal, a first dead-time interval being defined between the first and second edges of the clock pulse signal;
  charging a capacitive component to generate a memory signal, the memory signal having a value that is a function of the first dead-time interval; and generating a feedback signal indicating a voltage across a load;
  generating a memory signal, the memory signal having a value that is a function of the first dead-time interval; and
  generating a feedback signal indicating a voltage across a load;
  generating a first edge of a pulse control signal responsive to the feedback signal;
  deactivating the second switch control signal responsive to the feedback signal exceeding a threshold;
  discharging the capacitive component responsive to the first edge of the pulse control signal;
  generating a second edge of the pulse control signal responsive to the operation of discharging the capacitive component; and
  activating the first switch control signal responsive to the second edge of the pulse control signal, the duration between first and second edges of the pulse control signal being a function of a value of the memory signal.

6. The method of claim 5 wherein the feedback signal comprises a pulse signal having a rising edge that is generated responsive to a comparison between the signal from the load and a reference voltage value.

7. The method of claim 5 wherein the time between generating the first and second edges of the pulse control signal defines a second dead-time interval, and wherein the memory signal is generated by charging a capacitive component during the first dead-time interval and discharging the capacitive component during the second dead-time interval.

8. The method of claim 7 wherein the capacitive component is precharged to a non-zero start voltage prior to charging the capacitor during the first dead-time interval.

9. A converter circuit, comprising:
  a first switching circuit having a first output node adapted to be coupled to a load;
  a second switching circuit having a second output node coupled to the first output node;
  a dead-time generation circuit adapted to receive a feedback signal derived from a signal applied to the load, the dead-time generation circuit operable to generate a memory signal having a value that is a function of a first dead-time interval and the dead-time generation circuit further operable responsive to the feedback signal to generate a first edge of a pulse control signal and to generate a second edge of the pulse control signal as a function of the memory signal, with a second dead-time interval being defined between the first and second edges of the pulse control signal, and wherein the dead-time generation circuit is operable during the first dead-time interval to charge a capacitive element to generate the memory signal and is operable during the second dead-time interval to discharge the capacitive element and generate the second edge of the pulse control signal responsive to the memory signal across the capacitive element reaching a threshold value;
  a first drive circuit adapted to receive the feedback signal and a clock pulse signal, the clock pulse signal having first and second edges that define the first dead-time interval, and the first drive circuit coupled to the first switching circuit and operable in a synchronous mode responsive to the second edge of the clock pulse signal to activate the first switching circuit and operable in an asynchronous mode responsive to the feedback signal to deactivate the first switching circuit; and
  a second drive circuit coupled to the dead-time generation circuit to receive the pulse control signal and adapted to receive the clock pulse signal, the second drive circuit coupled to the second switching circuit and operable in the synchronous mode to deactivate the second switching circuit responsive to a first edge of the clock pulse signal and operable in the asynchronous mode responsive to the second edge of the pulse control signal to activate the second switching circuit.

10. The circuit of claim 9 wherein the first and second switching circuits each comprise a MOS transistor.

11. The circuit of claim 9 wherein the first drive circuit comprises:
- an error amplifier adapted to receive a signal from the load and adapted to receive a reference voltage, the error amplifier providing an error output having a value that is a function of the difference between the signal from the load and the reference voltage;
- a controller coupled to the error amplifier to receive the error output and operable to generate the feedback signal responsive to the error output; and
- a driver coupled to the controller to receive the feedback signal and operable to generate and apply a control signal to the first switching circuit responsive to the feedback signal and the clock pulse signal.

12. The circuit of claim 9 wherein the first edge of the pulse control signal comprises a rising edge and wherein the second edge of the pulse control signal comprises a falling edge, and wherein the first edge of the clock pulse signal comprise a rising edge and the second edge of the clock pulse signal comprises a falling edge.

13. An electronic system, comprising:
- electronic circuitry;
- a first switching circuit having a first output node coupled to the electronic circuitry;
- a second switching circuit having a second output node coupled to the first output node;
- a dead-time generation circuit adapted to receive a feedback signal derived from a signal applied to the electronic circuitry, the dead-time generation circuit operable to generate a memory signal having a value that is a function of a first dead-time interval and the dead-time generation circuit further operable responsive to the feedback signal to generate a first edge of a pulse control signal and to generate a second edge of the pulse control signal as a function of the memory signal, with a second dead-time interval being defined between the first and second edges of the pulse control signal, and wherein the dead-time generation circuit is operable during the first dead-time interval to charge a capacitive element to generate the memory signal and is operable during the second dead-time interval to discharge the capacitive element and generate the second edge of the pulse control signal responsive to the memory signal across the capacitive element reaching a threshold value;
- a first drive circuit adapted to receive the feedback signal and a clock pulse signal, the clock pulse signal having first and second edges that define the first dead-time interval, and the first drive circuit coupled to the first switching circuit and operable in a first mode responsive to the second edge of the clock pulse signal to activate the first switching circuit and operable in a second mode responsive to the feedback signal to deactivate the first switching circuit; and
- a second drive circuit coupled to the dead-time generation circuit to receive the pulse control signal and adapted to receive the clock pulse signal, the second drive circuit coupled to the second switching circuit and operable in a first mode to deactivate the second switching circuit responsive to a first edge of the clock pulse signal and operable in a second mode responsive to the second edge of the pulse control signal to activate the second switching circuit.

14. The electronic system of claim 13 wherein the electronic circuitry comprises one of computer circuitry, cellular telephone circuits, portable digital assistant circuitry, and automotive control circuitry.

* * * * *

UNITED STATES PATENT AND TRADEMARK OFFICE
CERTIFICATE OF CORRECTION

| | | |
|---|---|---|
| PATENT NO. | : 7,880,458 B2 | Page 1 of 1 |
| APPLICATION NO. | : 11/634655 | |
| DATED | : February 1, 2011 | |
| INVENTOR(S) | : Eliana Cannella et al. | |

It is certified that error appears in the above-identified patent and that said Letters Patent is hereby corrected as shown below:

- In Claim 3, Column 7, Line 31 of the patent, should read "a generator module operable to charge a capacitive component to"

- In Claim 5, Column 7, Line 62-65 should be deleted, Line 62 should be "generating a first edge of a pulse control signal responsive".

Signed and Sealed this
Twenty-second Day of March, 2011

David J. Kappos
*Director of the United States Patent and Trademark Office*